United States Patent [19]

Tajima

[11] Patent Number: 4,589,103
[45] Date of Patent: May 13, 1986

[54] TILT COMPENSATION TRACKING CONTROL SYSTEM FOR OPTICAL DISCS

[75] Inventor: Osamu Tajima, Ayase, Japan

[73] Assignee: Victor Company of Japan, Limited, Japan

[21] Appl. No.: 460,561

[22] Filed: Jan. 24, 1983

[30] Foreign Application Priority Data

Jan. 22, 1982 [JP] Japan ................................ 57-8304

[51] Int. Cl.<sup>4</sup> .............................................. G11B 7/00
[52] U.S. Cl. ..................................................... 369/46
[58] Field of Search ...................... 369/44, 46, 32, 33, 369/41; 250/202

[56] References Cited

U.S. PATENT DOCUMENTS

| | | | |
|---|---|---|---|
| 4,365,324 | 12/1982 | Michaelis | 369/44 |
| 4,408,314 | 10/1983 | Yokota | 369/46 |
| 4,467,462 | 8/1984 | Shibata | 369/44 |

FOREIGN PATENT DOCUMENTS

| | | |
|---|---|---|
| 0070408 | 1/1983 | European Pat. Off. |
| 0099576 | 2/1984 | European Pat. Off. |
| 2339928 | 8/1977 | France |
| 2034097 | 5/1980 | United Kingdom |

OTHER PUBLICATIONS

Patent Abstracts of Japan, vol. 7, No. 6 (P-167)(1151), Jan. 11, 1983; & JP-A-57 164447 (Matsushita Denki Sangyo K.K.) 09-10-1982.
Patent Abstracts of Japan, vol. 7, No. 6 (P-167)(1151), Jan. 11, 1983; & JP-A-57 164448 (Matsushita Denki Sangyo K.K.) 09-10-1982.
Video Disk and Digital Audio Disk for Beginners, Japanese Publication.
Sheng; Theoretical Considerations of Optical Diffraction from RCA Video Disc Signals; RCA Review; vol. 39, Sept. 1978, pp. 512-555.

Primary Examiner—Robert L. Richardson
Attorney, Agent, or Firm—Lowe, Price, Leblanc, Becker & Shur

[57] ABSTRACT

A grooveless record having parallel tracks on which information is recorded as a series of microscopic pits is illuminated with a laser which reflects off to a pair of first and second adjoining optoelectrical sensing elements (7a, 7b) to generate respective output signals so that the sensing elements are equally illuminated when the laser beam is kept at a predetermined angle of incidence on the path of the record track. To compensate for tracking errors resulting from the tilting of the record, there is derived from the sensing elements a pair of first and second peak value signals each bearing exclusively the information on the tilt angle. The output signals from the first and second sensing elements are modulated in magnitude with the first and second peak value signals by multiplier circuits (30, 31; 40, 41) and fed to a subtractor (37; 70) for detecting the difference between the two modulated signals to generate a tracking control signal so that the error information is nullified at the output of the subtractor.

15 Claims, 14 Drawing Figures

TILT COMPENSATION TRACKING CONTROL SYSTEM FOR OPTICAL DISCS

BACKGROUND OF THE INVENTION

The present invention relates to a tracking control system for grooveless disc records, and in particular to such systems wherein the tracking error caused by the tilting of the disc record is eliminated.

Tracking control systems for grooveless records involve the use of an optical sensing device which emits a laser beam onto the record and a pair of adjoining optoelectrical elements on which the reflecting beam is made to be incident. The laser beam incident on the record surface is modulated in intensity in accordance with the surface variation of the record which is in the form of a series of microscopic pits having a depth approximately a quarter wavelength of the laser. The reflected light, thus varying between high and low discrete values corresponding respectively to the pits and the land portions of the record, is directed to the optoelectrical elements to form a beam spot thereon so that when the optical axis of the sensing laser is out of the path of a track, the beam spot on the optoelectrical sensing elements is displaced from a neutral line which exists between them. The output signals of the optoelectrical elements are fed to a differential amplifier or subtractor to detect the difference between them to provide a tracking control signal which is used to control the lateral position of the laser beam. However, the disc record has a tendency to tilt with respect to the horizontal. When this occurs the beam spot on the optoelectrical sensors will deviate erroneously producing a false tracking control signal.

SUMMARY OF THE INVENTION

It is therefore an object of the present invention to provide a tracking control system which eliminates tracking errors caused by the loss of a predetermined angular relationship between the optical axis of a sensing laser and the surface plane of a record.

The present invention is based on the fact that the sensing laser is modulated in intensity by the microscopic pits and land portions of the record into a signal having two discrete values. The invention is based on the discovery that the information contained in the reflections at the land portions relates exclusively to the angular displacement of the record, while the information contained in the reflections at the pits relates both to the angular displacement of the record and to the lateral displacement of the sensing laser from the track path. The present invention contemplates to nullify the tracking errors by modulating the information obtained from the pits with the information obtained from the land portions.

According to the broader aspect of the invention, the tracking control system comprises a pair of first and second adjoining optoelectrical sensing elements separated by a neutral line and an optical device mounted above the record in laterally movable relation to the path of the tracks in response to a tracking control signal for emitting a light beam to the surface of the record and directing light reflected off the record surface to form a beam spot on the sensing elements. When the light beam is maintained at a predetermined angle of incidence on the record surface and is following the path of a given track the center of the beam spot is on the neutral line and when the record tilts causing the sensing beam to deviate from the predetermined angle of incidence and when the incident light beam deviates from the path of the given track the center of the beam spot deviates from the neutral line, so that the tracking control signal contains false information. Maximum detectors are connected to the first and second optoelectrical elements to derive a pair of first and second peak value signals corresponding to the land portions of the record, which signals exclusively contain information as to the angular displacement of the record. Modulator circuits are also connected to the optoelectrical elements for modulating the magnitude of the output signals therefrom with the first and second peak value signals and applying the modulated signals to a subtractor such that the false information is nullified at the output of the subtractor.

According to a first specific aspect of the invention, the false tracking information is nullified by multiplying the output signals of the first and second optoelectrical elements by the second and first peak value signals, respectively.

According to a second specific aspect of the invention, a comparator is provided for comparing the first and second peak value signals against each other to generate one of first and second comparator outputs depending on their relative values. In response to the first comparator output, the false tracking information is nullified by multiplying the output signal of the second optoelectrical element by the first peak value signal and dividing it by the second peak value signal and subtracting it from the output of the first optoelectrical element. In response to the second comparator output the false information is nullified by multiplying the output signal of the first optoelectrical element by the second peak value signal and dividing it by the first peak value signal and subtracting the output of the second optoelectrical element from the divided signal.

According to a further aspect of the invention, a lower-amplitude higher-frequency component of the output signals of the first and second optoelectrical elements are rejected by a detector to apply a higher-amplitude lower-frequency component of said output signals to the modulator circuits.

BRIEF DESCRIPTION OF THE DRAWINGS

The present invention will be described in further detail with reference to the accompanying drawings, in which.

DETAILED DESCRIPTION

Before going into the detail of the present invention the underlying principle of the present invention will be first described with reference to FIGS. 1 to 5.

Figure 1:
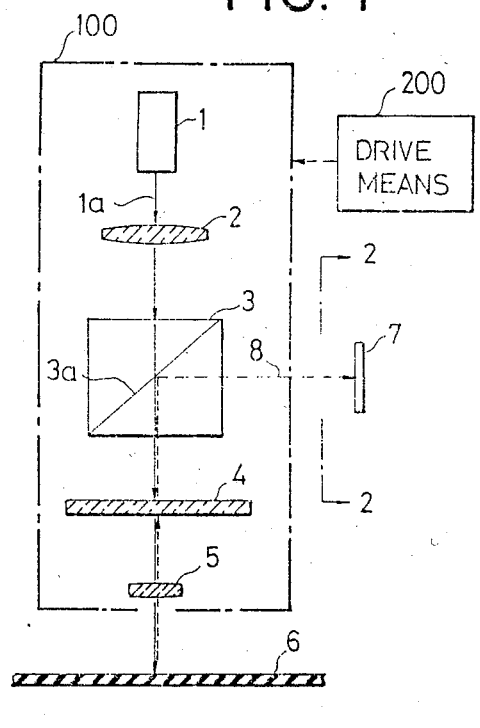
FIG. 1 is a diagram schematically illustrating an optical sensing device which forms part of the tracking control system.

In FIG. 1 there is shown an optical sensing device 100 which is mounted above the surface of a disc record and laterally movable with respect to the path of parallel tracks of the record by means of a drive means 200 in response to a tracking control signal. The optical sensing device comprises a semiconductor laser 1 for emitting a linearly polarized laser beam indicated by a solid line 1a. The beam is collimated by a lens 2 and passed through a polarizer prism 3 to a quarterwave phase shifter 4 so that the beam emerges therefrom as a circularly polarized light. A focusing lens 5 is located below the phase shifter 4 to bring the beam into focus on the surface of a disc record having a high degree of reflectivity on which information is recorded in the form of a series of microscopic pits along concentric or spiral tracks.

The beam is reflected off the record as indicated by a broken line 8 in a direction exactly opposite to the direction of incidence if the plane of the record is precisely normal thereto. The direction of circular polarization is reversed upon reflection off the record surface. The reflected light is collected by the lens 5 and passes the quarterwave phase shifter 4 where it is converted to linearly polarized light. The conversion to linear polarization causes the beam to reflect off the reflecting surface 3a of the prism 3, which is inclined at 45 degrees to the angle of incidence, to a photodetector 7.

Figure 2:
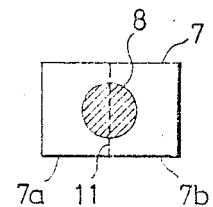
FIG. 2 is a view illustrating a pair of optoelectrical elements seen in the direction of the arrows 2 in FIG. 1, with the elements shown illuminated with reflected light.

As shown in FIG. 2, the photodetector 7 has a left-side segment 7a and a right-side segment 7b separated by a line 11 which bisects the spot size of the incident beam 8 when the record surface plane is exactly normal to the optical axis of the beam incident thereon and the sensing beam is exactly following the track path. When this occurs, the neutral line 11 corresponds to the record surface plane as well as to the optical axis of the information sensing beam and the photodetector segments 7a and 7b provide output signals of equal amplitude. If the beam is off the track path, there will occur a difference in amplitude between the two output signals of the photodetector 7 which can then be utilized to control the lateral position of the laser beam with respect to the track path.

Figure 3:
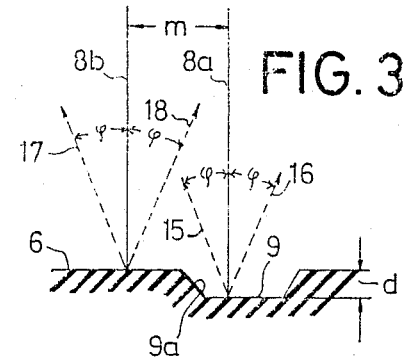
FIG. 3 is an enlarged cross-sectional view of a portion of the disc record for illustrating the directions of diffracted light from an edge portion of a microscopic pit.

The light is reflected off the surface of record as shown in FIG. 3. Microscopic pits 9 each have an inclined wall portion as indicated at 9a, and a depth "d" which is usually one-fifth to one-sixth of the wavelength of the laser beam. As a result, when the beam is kept on the center line 14 of a track and comes to a position as indicated by a hatched area 12 in FIG. 4, the light rays reflecting off the bottom of the pit and those reflecting off an adjacent land area are cancelled each other by interference, so that the reflected beam is of a minimum light intensity corresponding to a logical "0". When the focus point of the beam is shifted to a land area as shown at 13, the reflected beam has a maximum light intensity which corresponds to a logical "1".

Figure 4:
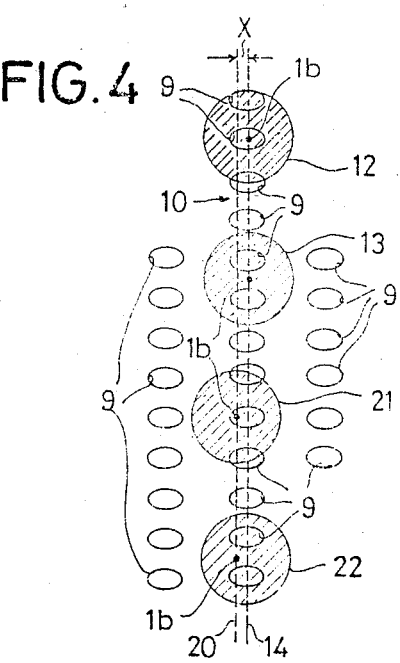
FIG. 4 is a plan view of a portion of the disc record where the hatched areas indicate the beam spots incident on various locations.

If the incident beam is laterally off the center line 14 of a given track by a distance "X" and follows a path 20 and comes to a position marked 21, FIG. 4, the beams's right-side portion 8a will illuminate the bottom of a pit 9 and its left portion 8b which is laterally spaced a distance "m" from the right portion 8a, will illuminate the land area of the disc 6 (FIG. 3). In this instance there is a diffraction of light similar to the diffraction caused by a hole, causing light rays 15 and 16 to diverge from the point of reflection from the pit 9 and light rays 17 and 18 to diverge from the point of reflection from the land area.

The path difference $\Delta_1$ between the leftwardly diffracted rays 15 and 17 and the path difference $\Delta_2$ as follows:

$$\Delta_1 = d(1 + \cos \psi) + m \sin \psi \quad (1)$$
$$\simeq 2d + m\psi \text{ (where, } \psi << 1\text{)}$$
$$\Delta_2 = d(1 + \cos \psi) - m \sin \psi \quad (2)$$
$$\simeq 2d - m\psi \text{ (where, } \psi << 1\text{)}$$

Therefore, in a particular instance where the path difference $\Delta_1$ is slightly larger than a half wavelength value, the path difference $\Delta_2$ is smaller than a half wavelength value, and is in a range between 2/5 and 2/6 of the full wavelength. Thus, in this instance, for a proper set of $\lambda$, m, and d, the leftwardly diffracted components destructively interact with each other, while the rightwardly diffracted components constructively interact with each other. The reflection from the inclined wall 9a adds up to the rightwardly diffracted components. This will cause the photodetector 7 to generate outputs indicating that the laser beam is deviating to the left of the track path. If the beam is moved to a land area shown at 22, no diffraction occurs and the reflected beam impinges equally on the separated segments 7a and 7b of the photodetector.

Figure 5:
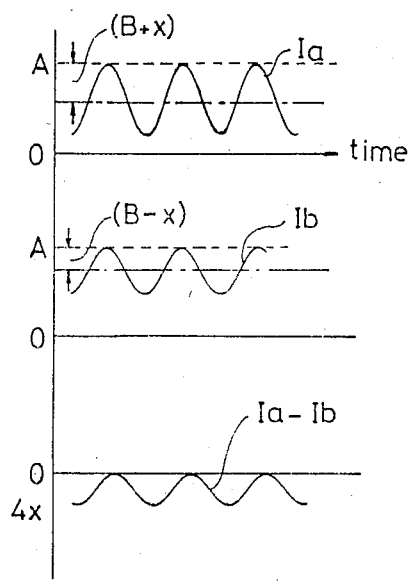
FIG. 5 is a waveform diagram illustrating the waveforms of the output signals of the optoelectrical elements and the waveform of the difference between these signals.

FIG. 5 shows the waveforms of the outputs I$a$ and I$b$ derived from the photodetector elements 7a and 7b respectively and the waveform of a tracking control signal I$a$−I$b$, when the beam is displaced off the track by an amount X resulting in a corresponding change "x" in signal level. The signals I$a$ and I$b$ are represented as follows:

$$Ia = A - B - x + (B + x) \cos \omega t \quad (3)$$

$$Ib = A - B + x + (B - x) \cos \omega t \quad (4)$$

$$Ia - Ib = -2x + 2x \cos \omega t \quad (5)$$

where A is the magnitude of the signal derived when the beam is illuminating the land portion of the disc 6 and B is the amplitude of the signal when the beam is correctly tracing the track path.

If the disc record is tilted so that its surface becomes not perpendicular to the angle of incidence of the laser beam, the beam spot on the photodetector 7 will deviate on one side of the neutral line 11 depending on the direction and angle of the tilt. More specifically, the tracking control signal derived from the beam impinging on a pit 9 is affected so that it contains information on the deviation of the beam from the track path as well as information on the angle of tilt of the record 6. In addition, the tracking signal derived from the beam impinging on a land portion of the record is affected so that it contains information only with respect to the disc's tilt angle.

The tilt angle information now contained in these 5 tracking control signals will now be analyzed in quantitative terms. The beam spot on the photodetector 7 is now displaced from the line 11 by an amount proportional to the focal distance of the lens 5 times the tilt angle of the disc 6 to the horizontal, and the amount of light incident on the photodetector segment 7a, for example, will increase by an amount "$\alpha$" which is proportional to that displacement times the effective diameter of the lens 5, while the amount of light incident on the other element 7b will decrease by the same amount.

If the center of incident beam is located in land portions as at 13 and 22 (FIG. 4), the photodetector elements 7a and 7b provide output signals La and Lb as follows, respectively:

$$La = A + \alpha A \quad (6)$$

$$Lb = A - \alpha A \quad (7)$$

On the other hand, the photodetector elements 7a and 7b provide the following output signals Pa and Pb when the center of the beam is located on pits as at 12 and 21:

$$Pa = Ia + \alpha Ib \quad (8)$$

$$Pb = Ib - \alpha Ib \quad (9)$$

where Ia and Ib are the output signals of the detectors 7a and 7b, respectively, which are derived when the disc 6 is not tilted.

If the difference between Equations 8 and 9 is taken as in the prior art tracking control circuit, the control signal will be given by, $$Ia - Ib + 2\alpha Ib \quad (10)$$

in which the third term $2\alpha Ib$ indicates an error by which the beam spot on the photodetector 7 will deviate from the neutral line 11 as a result of the tilting of the disc even if the reading light is in registry with the pit centers.

According to the present invention, the following Equations are obtained respectively by multiplying Equations 7 and 8, and multiplying Equations 6 and 9 as follows:

$$(Ia + \alpha Ib)A(1-\alpha) = (Ia - \alpha Ia + \alpha Ib - \alpha^2 Ib)A \quad (11)$$

$$(Ib - \alpha Ib)A(1+\alpha) = (Ib - \alpha^2 Ib)A \quad (12)$$

By taking the difference between Equations 11 and 12, the result is given in following Equation:

$$(Ia - Ib)(1-\alpha)A \quad (13)$$

Equation 13 implies that the component $(Ia - Ib)$ is amplified by a multiplying factor $(1-\alpha)A$. While this multiplying factor may vary as a function of the tilt angle of the disc, this only results in a variation of the loop gain of the tracking servomechanism. Since this loop gain variation equally affects the Ia and Ib components, the loop gain is balanced between sensors 7a and 7b and since the $\alpha$ value is much less than unity, the $(1-\alpha)A$ component of the control signal does not produce false tracking control signal due to the tilting of the disc in practical applications.

Alternatively, the tilt angle compensation can also be achieved as follows.

Equation 8 − {Equation 9 × (Equation 6/Equation 7)} = (14)
$Ia - \alpha Ib - \{(Ib + \alpha Ib) \times (A + \alpha A)/(A - \alpha A)\} = Ia - Ib$ The present invention embodying the underlying principle explained above will now be described with reference to FIGS. 6 to 9.

Figure 6:
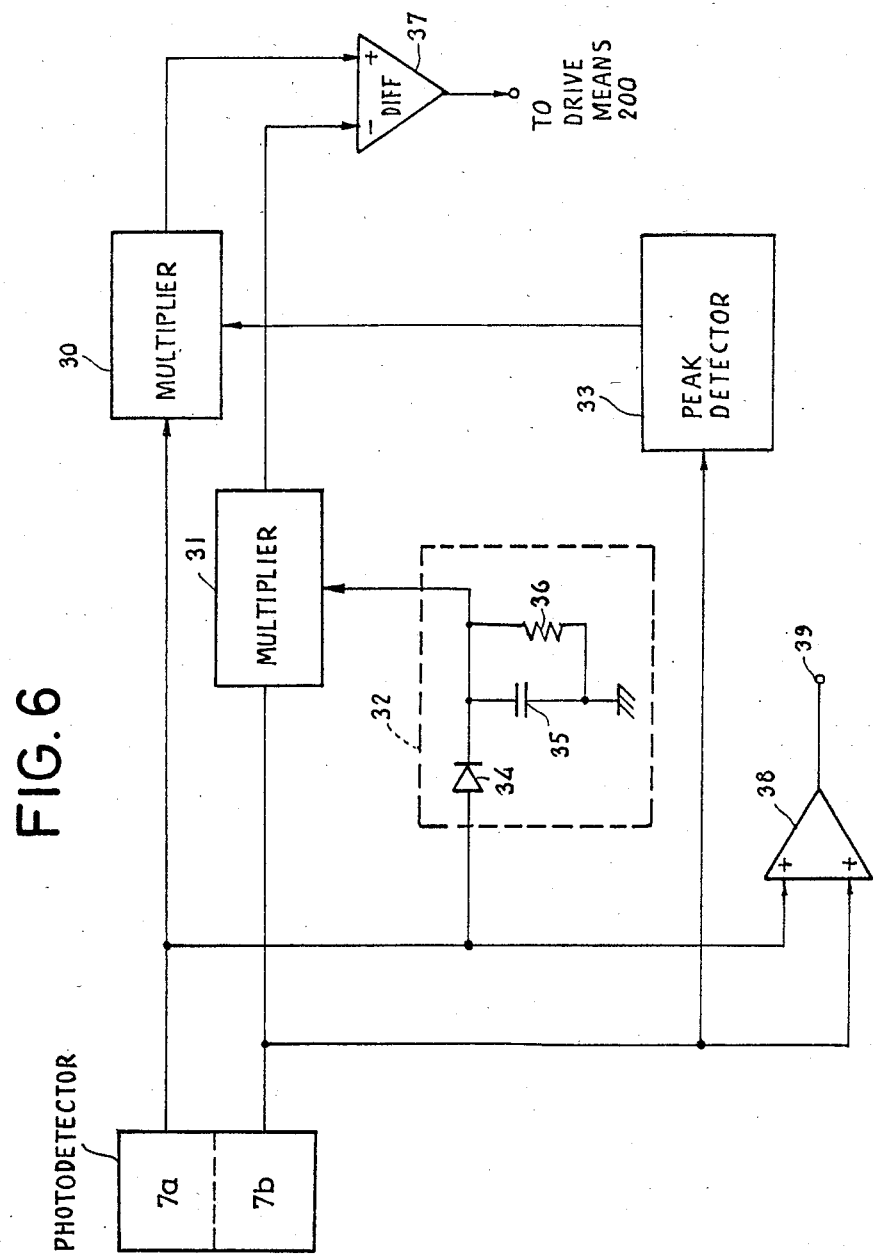
FIG. 6 is a block diagram of a first embodiment of the tracking control circuit of the invention.

In FIG. 6, there is shown an embodiment of the tracking control circuit of the invention. The circuit comprises a pair of multiplier circuits 30 and 31 having their first input terminals coupled respectively to the outputs of the photodetector elements 7a and 7b and a pair of identical peak detectors 32 and 33. The peak detector 32 is of a conventional design which is typically formed by a diode 34 having its anode coupled to the output of detector elements 7a and its cathode coupled to a second input terminal of the multiplier circuit 31. A capacitor 35 and a resistor 36 are coupled in parallel between the cathode of diode 34 and ground. The peak detector 33 is of the same construction as peak detector 32 and has its input coupled to the output of photodetector segment 7b and its output coupled to a second input terminal of the multiplier 30. The multipliers 30 and 31 thus modulate the magnitude of the output signals of the photodetector segments 7a and 7b with peak value signals from peak detectors 33 and 32, respectively. The output terminals of the multipler circuits 30 and 31 are connected to the noninverting and inverting input terminals of a differential amplifier or subtractor 37 to generate a tracking control signal for application to drive means 200 which controls the lateral position of the laser beam incident on the record 6.

Since the output signals of the photodetector elements 7a and 7b are at peak values when the beam is illuminating a land portion of the disc 6, the output of the peak detector 32 is indicative of the multiplier $A(1+\alpha)$ of Equation 12 while the output of peak detector 33 is indicative of the multiplier $A(1-\alpha)$ of Equation 13. The multiplier circuit 30 provides multiplication of the multiplicand $(Ia + \alpha Ib)$ by the multiplier $A(1-\alpha)$ to generate an output signal representing Equation 12 and the multiplier circuit 31 provides multiplication of the multiplicand $(Ib - \alpha Ib)$ by the multiplier $A(1+\alpha)$ to generate an output signal representing Equation 13. These output signals are combined in the subtractor 37 to generate a control signal representing $(Ia - Ib)(1-\alpha)A$.

The outputs of the photodetector segments 7a and 7b are also coupled to an adder 38 from which the combined output is delivered to an output terminal 39 for utilization of the information signal detected from the disc record 6.

Figure 7:
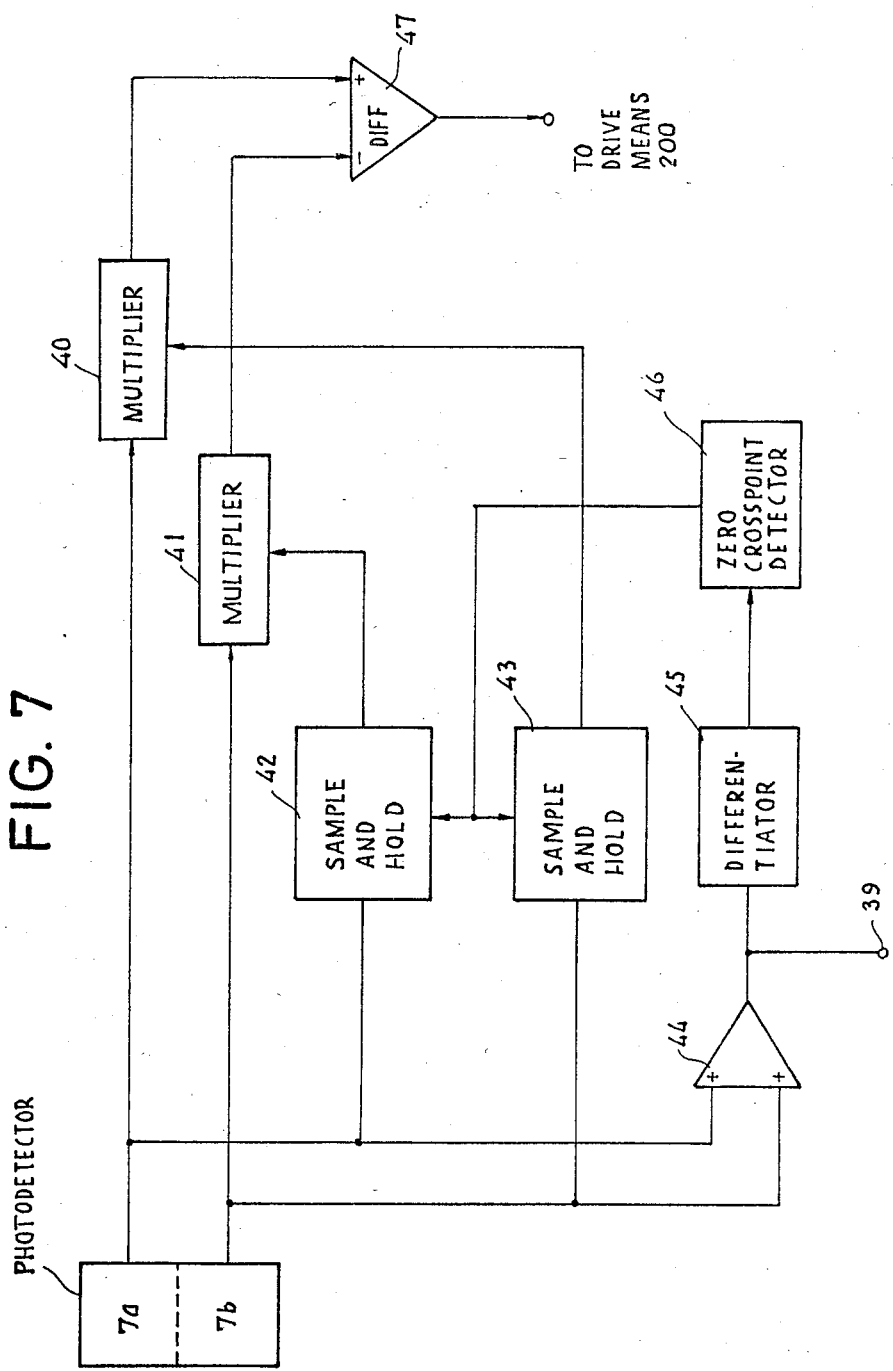
FIG. 7 is a block diagram of an alternative embodiment of the invention.

FIG. 7 is an illustration of a modification of of the embodiment of FIG. 6 by the provision of sample-and-hold circuits 42 and 43 instead of the peak detectors 32 and 33 of FIG. 6. The sample-and-hold circuits 42 and 43 are coupled to the photodetector elements 7a and 7b respectively to sample the peak values of the detected information signal in response to a respective sampling pulse derived from a circuit formed by an adder 44, a differentiator 45 and a zero crosspoint detector 46. The differentiator 45 provides a signal which is 90° phase-shifted with respect to the detected information signal. The zero crosspoint detector 46 detects the zero crossing point of the differentiated signal and generates a sampling pulse that corresponds to the peak value of the detected information signal. The peak values sampled by the circuits 42 and 43 are applied as the multipliers of Equations 11 and 12 to the second input terminals of multiplier circuits 41 and 40 which are coupled to the photodetector elements 7b and 7a, respectively. A subtractor 47 is in receipt of the outputs of multiplier circuits 40 and 41 to generate the tracking control signal.

Figure 8:
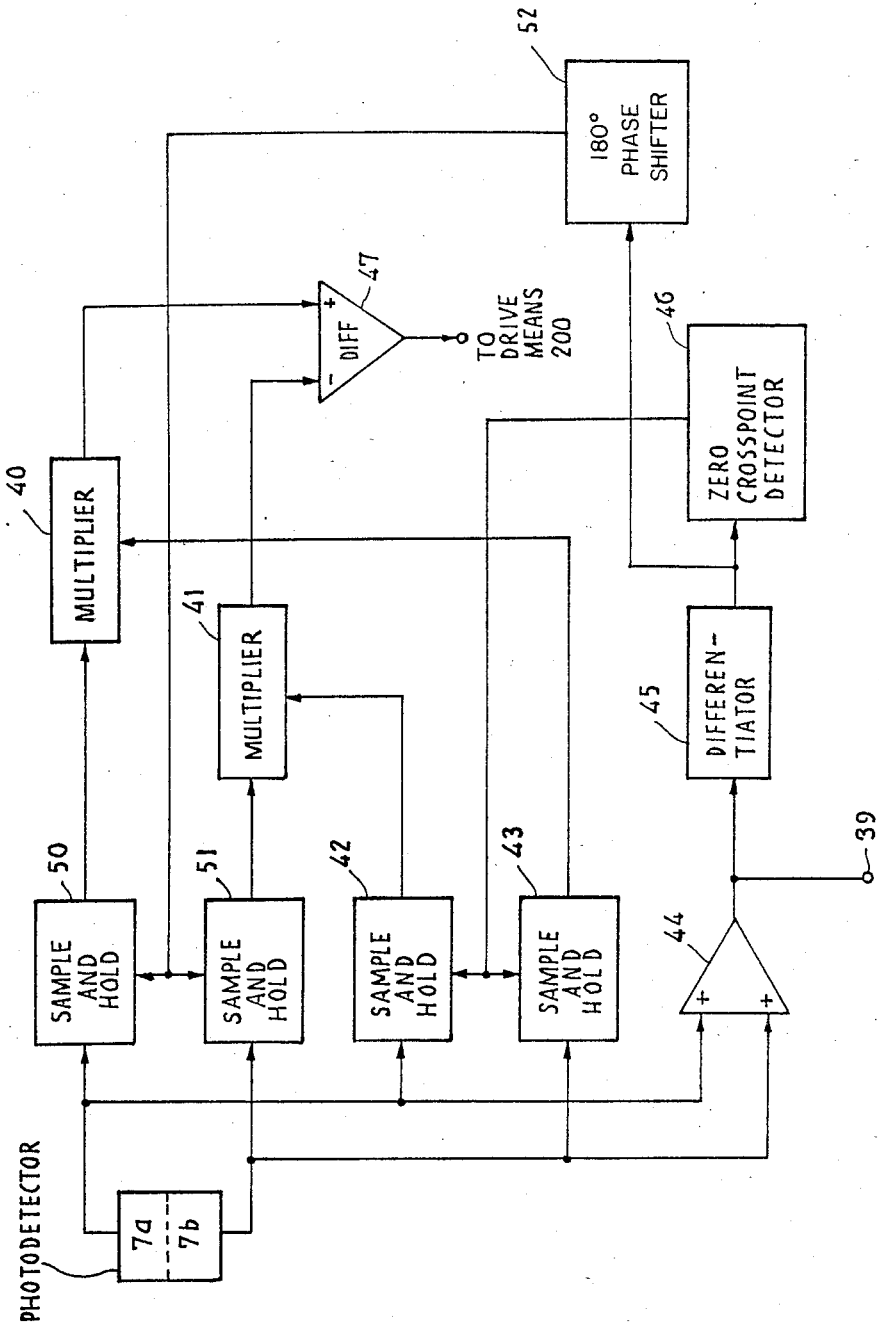
FIG. 8 is a block diagram of a preferred form of the first embodiment of the invention.

The embodiment of FIG. 7 is modified in a manner as shown in FIG. 8. Two additional sample-and-hold circuits 50 and 51 are connected respectively to the outputs of the photodetector segments 7a and 7b to sample the minimum values of the detected information signal derived when the laser beam is illuminating the pits on the record. Since the minimum values are phase shifted by 180° with respect to the peak values, the sampling pulse for the sample-and-hold circuits 50 and 51 are derived from a 180° phase shifter 52 coupled to the output of the zero crosspoint detector 46. The signals representing the minimum values sampled by sample-and-hold circuits 50 and 51 are fed to multiplier circuits 40 and 41 as the multiplicands of Equations 11 and 12, respectively. The provision of sample-and-hold circuits 50 and 51 is advantageous in terms of signal-to-noise ratio since the differences between the multiplicands and multipliers of Equations 11 and 12 are maximized.

Figure 9:
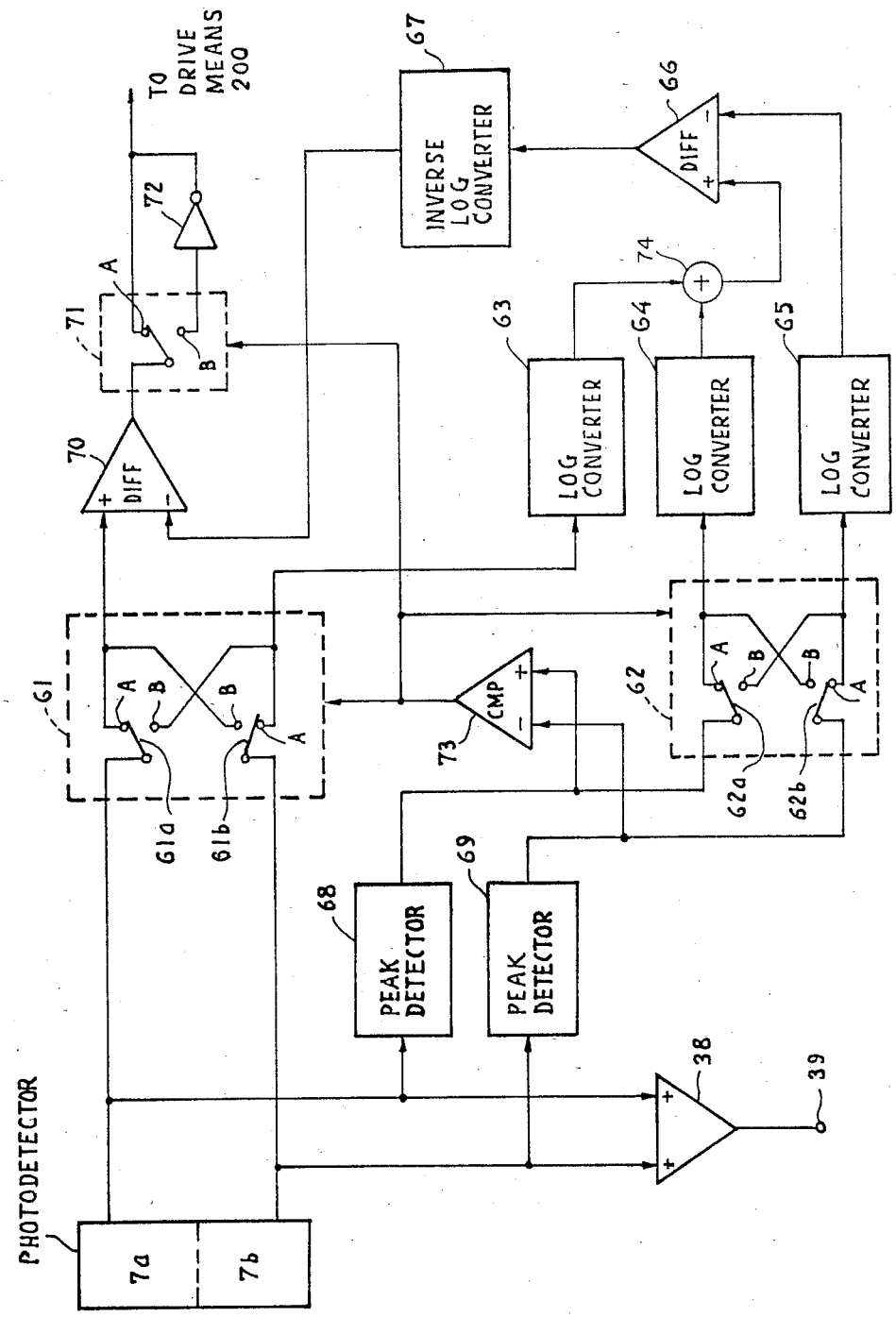
FIG. 9 is a block diagram of a second embodiment of the invention.

A further embodiment shown in FIG. 9 is a realization of Equation 14. This embodiment is characterized by the provision of a pair of switching circuits 61 and 62, a set of log converters 63, 64 and 65, a subtractor 67 and an inverse log converter 67. A comparator 73 is further provided to compare the outputs of peak detectors 68 and 69 to control the switching circuits 61 and 62. Further included are a switching circuit 71 coupled to the output of the subtractor 70 to apply the output of the subtractor 70 directly or via an inverter 72 to the drive means 200.

When the disc record 6 is tilted so that the beam spot on the photodetector 7 is shifted toward the element 7a, the output of peak detector 68 is greater than the output of peak detector 69 and the comparator 73 provides a logical "0" output. In the presence of the logical "0" output, the switching circuits 61 and 62 are switched to the A position. During this condition the output of photodetector element 7a is connected, on the one hand, via a contact 61a of the switching circuit 61 to the noninverting input of a subtractor 70 as the first term $(Ia+aIb)$ of Equation 14, and on the other hand, via a peak detector 68 and a contact 62a of the switching circuit 62 to the log converter 64. The output of photodetector element 7b is connected on the one hand, via a contact 61b of the switching circuit 61 to the log converter 63, and on the other hand, via a peak detector 69 and a contact 62b of the switching circuit 62 to the log converter 65.

The outputs of the log converters 63, 64 and 65 respectively represent the log values of the factors of the second term of equation 14. The outputs of log converters 63 and 64 are added up in an adder 74 and fed to the noninverting input terminal of the differential amplifier or subtractor 66 and the output of log converter 65 is connected to the inverting input of that subtractor. The inverse log converter 67 reconverts the output of the subtractor 66, whereby the second term of Equation 14 is applied to the inverting input of the subtractor 70, so that the result of Equation 14 is obtained at the output of this subtractor and delivered directly to the drive means 200 through the switching circuit 71.

If the output of peak detector 69 becomes greater than the output of detector 68 when the disc 6 is tilted in the opposite direction, the comparator 73 output switches to a logical "1". When this occurs, the outputs of photodetector elements 7a and 7b are represented by $(Ia-aIa)$ and $(Ib+aIa)$, respectively. The switching circuits 61, 62 and 71 are now switched to the B position and the circuit functions to derive the result of the following Equation at the output of the subtractor 70:

$$Ib + aIa - \{(Ia - aIa)(A + aA)/(A - aA)\} = Ib - Ia \quad (14a)$$

The sign of Equation 14a is reversed by the inverter 72 to compensate for the tilting of disc 6 in the opposite direction.

While the beam spot size on the record is determined so that it is smaller than the spacing between adjacent pits 9, the beam spot may cover two adjacent pits as illustrated in FIG. 4 if the density of pits is high. Due to the fact that the laser beam has a Fourier distribution of energy (with the center maxima shown at 1b in FIG. 4), the signals derived from the photodetector 7 will have peak values of smaller magnitudes in response to the higher frequency component of the recorded information than for the lower-frequency component of the information. This will result in an error in the tracking control signal.

This problem is eliminated by the inclusion of low-pass filters or Schmitt trigger circuits for detecting the peak values higher than a predetermined value to exclude the peak values lower than that value.

Figure 10:
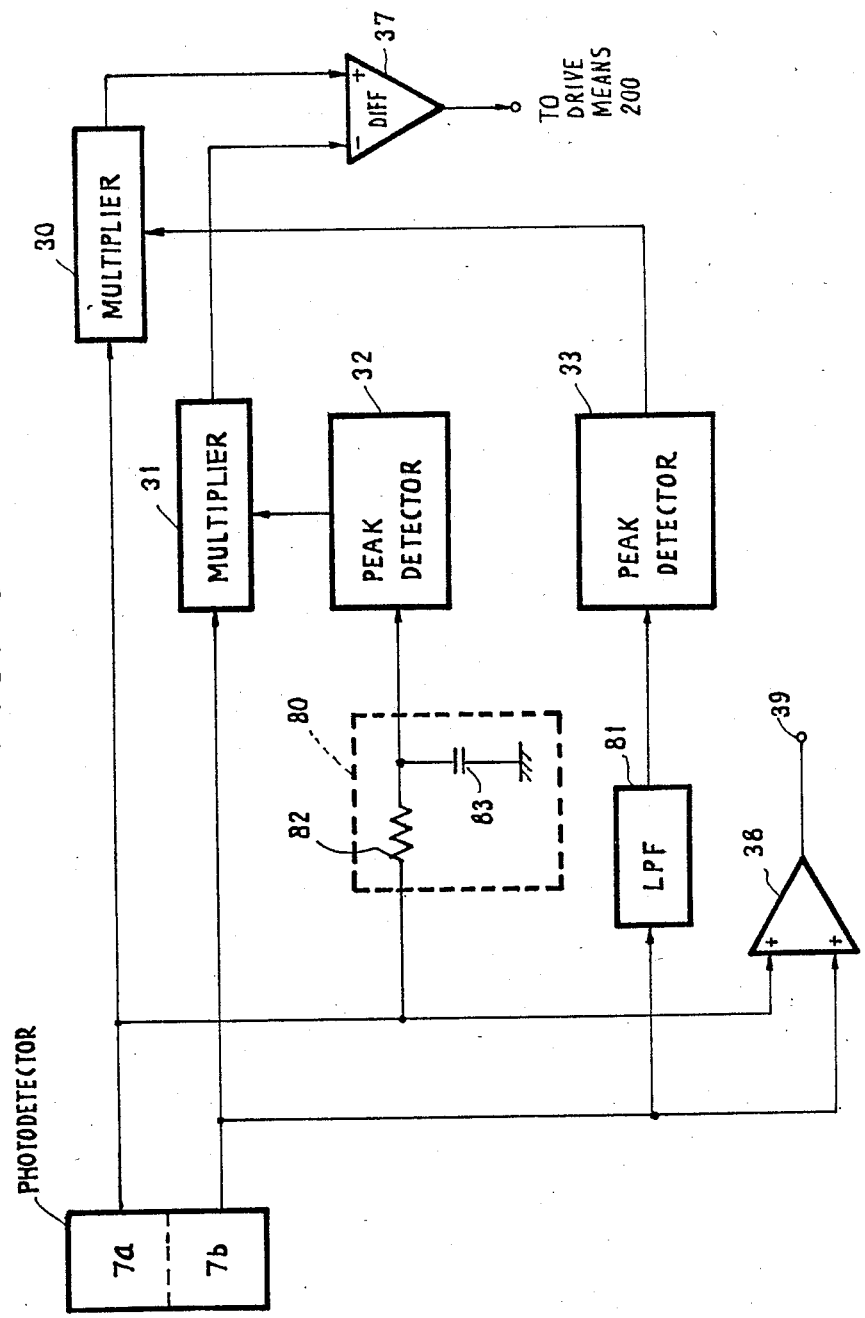
FIGS. 10 to 12 are block diagrams of modified embodiments of the invention.
Figure 12:
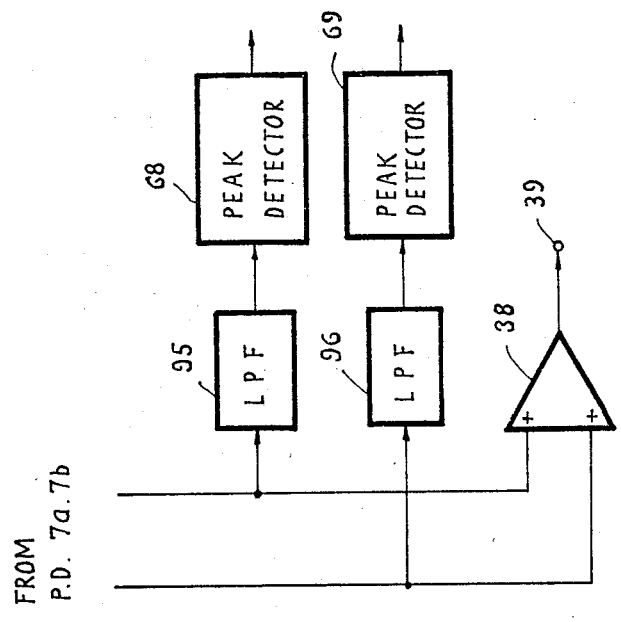
Figure 11:
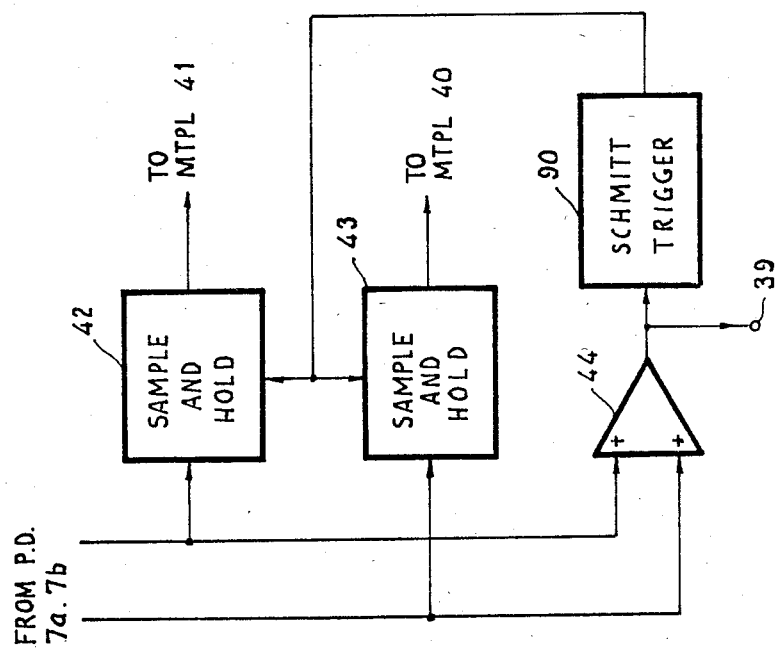

For this reason, the previous embodiments are modified as shown in FIGS. 10 to 12 in which the same numerals are used to indicate parts corresponding to those in the previous embodiments.

Figure 13:
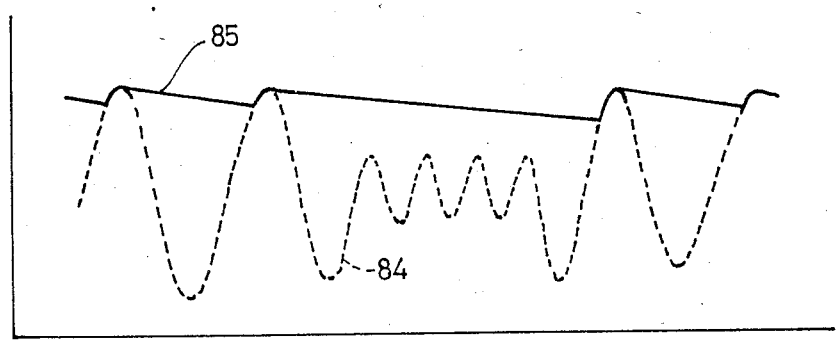
FIGS. 13 and 14 are waveform diagrams useful for describing the operation of the modified embodiments.

In FIG. 10, low-pass filters 80 and 81 are connected from the photodetector segments 7a and 7b to the peak detectors 32 and 33, respectively. Each of the low-pass filters typically comprises a series combination of a resistor 82 and a capacitor 83 connected from the associated photodetector segment to ground with a junction therebetween connected to the input of the associated peak detector. The time constant value of resistor 82 and capacitor 83 is selected so that the output of each low-pass filter has a much lower level for the lower-frequency component than for the higher frequency component as indicated by a broken-line waveform 84 in FIG. 13. Typically, the time constant value of each low-pass filter is 1/10th of the discharge time constant value of the associated peak detector and the cut-off frequency of the low-pass filter is lower than several Hertz. As a result, the peak detectors 32 and 33 reject the higher-frequency components and generate a waveform 85. The multiplier circuits 30 and 31 are thus supplied with valid multiplying factors from the associated peak detectors.

Figure 14:
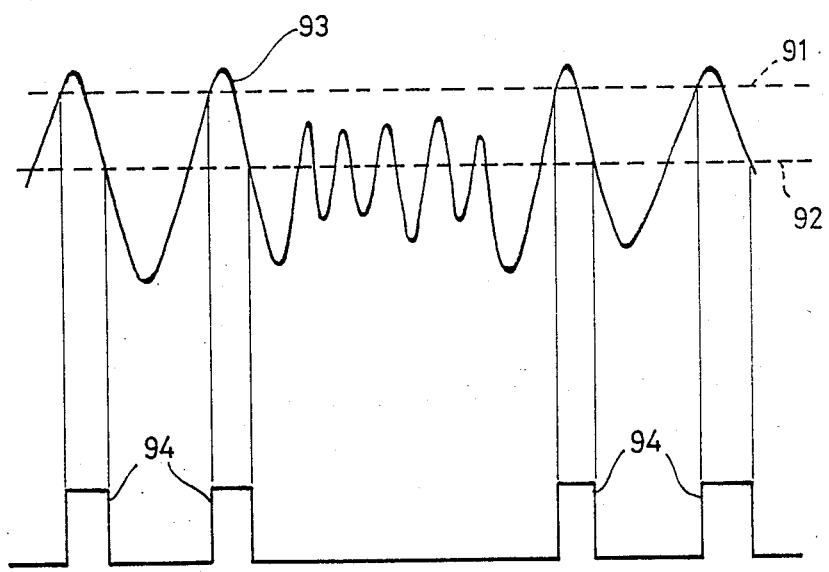

The modified embodiments of FIGS. 7 and 8 are shown in FIG. 11. The differentiator 45 and zero crosspoint detector 46 of the previous embodiments are replaced with a Schmitt trigger circuit 90 having higher and lower thresholds indicated by broken lines 91 and 92 in FIG. 14. The higher threshold 91 is set at a point between the maximum and minimum peak values which are derived respectively from the higher- and lower-frequency components. The Schmitt trigger 90 switches to a high level output state when the input signal from the adder 44 (as indicated by a waveform 93) reaches the higher threshold level 91 and returns to the original state when the signal reduces below the lower threshold 92. Pulses 94 are thus generated by each Schmitt trigger circuit exclusively in response to the higher-frequency components of the recorded information to cause the sample-and-hold circuits 42 and 43 to sample the input signals having amplitude higher than a threshold corresponding to the threshold 91. During the interval in which the higher-frequency component exists the sample-and-hold circuits keep the most recently sampled values derived from land portions 10 and the multiplier circuits 41 and 42 use these values for multiplying the minimum values derived from pits 9.

FIG. 12 is a modification of the embodiment of FIG. 9. This modification is similar to that shown in FIG. 10 in that low-pass filters 95 and 96 are connected respectively from the photodetector segments 7a and 7b to the peak detectors 68 and 69, respectively.

The foregoing shows only preferred embodiments of the present invention. Various modifications are apparent to those skilled in the art without departing from the scope of the present invention which is only limited by the appended claims. Therefore, the embodiments shown and described are only illustrative, not restrictive.

What is claimed is:

1. A tracking control system for use with a grooveless record on which information is recorded in the form of a series of microscopic pits along parallel tracks, comprising:
   a pair of first and second adjacent optoelectrical elements separated by a neutral line;
   means mounted above said record in laterally movable relation to the path of said tracks in response to a tracking control signal for emitting a light beam to a surface of said record and directing light reflected off the record surface and forming a beam spot on a surface of said first and second optoelectrical elements so that when said emitted light beam has a predetermined angle of incidence on said record surface said tracking control signal is valid for following a path of a given track so that the center of said beam spot is aligned with said neutral line, and when said record tilts causing the emitted beam to deviate from said predetermined angle of incidence said tracking control signal contains false information;
   a subtractor;
   maximum detector means responsive to said first and second optoelectrical elements for detecting peak values of the output signals therefrom corresponding to land portions of the record to derive first and second peak value signals respectively from the first and secnd optoelectrical elements; and
   modulator means responsive to said first and second optoelectrical elements for modulating the magnitude of the output signals therefrom with said first and second peak value signals and applying the modulated signals to said subtractor to detect a difference therebetween such that said false information is nullified at the output of said subtractor.

2. A tracking control system as claimed in claim 1, wherein said modulator means comprises means for multiplying the output signals of said first and second optoelectrical elements by said second and first peak value signals, respectively.

3. A tracking control system as claimed in claim 2, wherein said maximum detector means comprises a pair of first and second peak detectors coupled respectively to said first and second optoelectrical elements for generating said first and second peak value signals, and wherein said multiplying means comprises a pair of first and second multiplier circuits for multiplying the magnitude of the output signals of said first and second optoelectrical elements by said second and first peak value signals, respectively.

4. A tracking control system as claimed in claim 2, wherein said maximum detector means comprises a pair of first and second sample-and-hold circuits coupled respectively to said first and second optoelectrical elements and means for detecting the occurrence of the peak values of the output signals of said optoelectrical elements to cause said sample-and-hold circuits to sample and hold the output signals of the associated optoelectrical elements.

5. A tracking control system as claimed in claim 1, further comprising minimum detector means for detecting and applying minimum values of the output signals of said first and second optoelectrical elements to said modulator means to be modulated with said peak values signals.

6. A tracking control system as claimed in claim 5, wherein said minimum detector means comprises a pair of first and second sample-and-hold circuits coupled to said first and second optoelectrical elements respectively, and means for detecting the occurrence of the minimum values of the output signals of said optoelectrical elements to cause said sample-and-hold circuits to sample and hold the output signals of the associated optoelectrical elements and applying the output signals of said sample-and-hold circuits to said modulating means.

7. A tracking control system as claimed in claim 2, further comprising minimum detector means for detecting and applying minimum values of the output signals of said first and second optoelectrical elements to said multiplying means to be multiplied by said second and first peak value signals, respectively.

8. A tracking control system as claimed in claim 7, wherein said minimum detector means comprises a pair of first and second sample-and-hold circuits coupled to said first and second optoelectrical elements respectively, and means for detecting the occurrence of the minimum values of the output signals of said optoelectrical elements to cause said sample-and-hold circuits to sample and hold the output signals of the associated optoelectrical elements and applying the output signals of said sample-and-hold circuits to said multiplying means.

9. A tracking control system for use with a grooveless record on which information is recorded in the form of a series of microscopic pits along parallel tracks, comprising:
   a pair of first and second adjacent optoelectrical elements separated by a neutral line;
   means mounted above said record in laterally movable relation to the path of said tracks in response to a tracking control signal for emitting a light beam to a surface of said record and directing light reflected off the record surface and forming a beam spot on a surface of said first and second optoelectrical elements so that when said emitted light beam has a predetermined angle of incidence on said record surface said tracking control signal is valid for following a path of a given track so that the center of said beam spot is aligned with said neutral line, and when said record tilts causing the emitted beam to deviate from said predetermined angle of incidence said tracking control signal contains false information;

a subtractor;

maximum detector means responsive to said first and second optoelectrical elements for detecting peak values of the output signals therefrom corresponding to land portions of the record to derive first and second peak value signals respectively from the first and second optoelectrical elements; and modulator means responsive to said first and second optoelectrical elements for modulating the magnitude of at least one of the output signals therefrom with said first and second peak value signals and applying the modulated signals to said subtractor such that said false information is nullified at the output of said subtractor;

wherein said modulator means comprises:

a comparator for comparing said first and second peak value signals with each other to generate one of first and second comparator outputs depending on relative values of the compared signals; and means responsive to said first comparator output for multiplying the magnitude of the output signal of said second optoelectrical element by the first peak value signal and dividing the magnitude of the multiplied signal by the second peak value signal and subtracting the divided signal from the output signal of said first optoelectrical element and further responsive to said second comparator output for multiplying the magnitude of the output signal of said first optoelectrical element by said second peak value signal and dividing the magnitude of the last-mentioned multiplied signal by said first peak value signal and subtracting the output signal of said second optoelectrical element from the last-mentioned divided signal.

10. A tracking control system as claimed in claim 9, wherein said multiplying and dividing means comprises:

first and second switching circuits each having two input terminals and two output terminals coupled to the input terminals in response to said first comparator output and reversely coupled to the input terminals in response to said second comparator output, the input terminals of said first switching circuit being coupled to said first and second optoelectric elements respectively, and the input terminals of said second switching circuit being receptive of the peak values of said first and second optoelectrical elements respectively;

a second subtractor having positive and negative input terminals;

first, second and third log converters, the first and second log converters having outputs coupled together to said positive input terminal and said third log converter having an output coupled to said negative input terminal, said first log converter having an input coupled selectively to said first and second optoelectrical elements through said first switching circuit and said second and third log converters having inputs responsive to the peak values of the outputs of said first and second optoelectrical elements through said second switching circuit; and an inverse log converter having an input coupled to the output of said second subtractor to apply an output signal therefrom as one of said modulated signals to the first-mentioned subtractor, the other of said modulated output signals being derived selectively from said first and second optoelectrical elements through said first switching circuit.

11. A tracking control system as claimed in claim 1, wherein said microscopic pits are spaced at variable intervals causing each of said optoelectrical elements to generate an output signal having a first component of higher amplitude and lower frequency and a second component of lower amplitude and higher frequency, further comprising means coupled to said optoelectrical elements for detecting said first component, and wherein said maximum detector means is responsive to the detected first component.

12. A tracking control system as claimed in claim 3, wherein said microscopic pits are spaced at long and short intervals causing each of said optoelectrical elements to generate an output signal having a first component of higher amplitude and lower frequency and a second component of lower amplitude and higher frequency, further comprising first and second low-pass filters coupled to said first and second optoelectrical elements respectively for passing the first components of the output signals of said first and second optoelectrical elements to said first and second peak detectors, respectively.

13. A tracking control system as claimed in claim 11, wherein said means for detecting said first component comprises a Schmitt trigger circuit.

14. A tracking control system as claimed in claim 4, wherein said microscopic pits are spaced at variable intervals causing each of said optoelectrical elements to generate an output signal having a first component of higher amplitude and lower frequency and a second component of lower amplitude and higher frequency, wherein said means for detecting the occurrence of the peak values comprises a Schmitt trigger circuit responsive to said first component to generate sampling pulses to causes said first and second sample-and-hold circuits to sample and hold the output signals of the associated optoelectrical elements.

15. A tracking control system as claimed in claim 9, wherein said maximum detector means comprises a pair of first and second peak detectors, and wherein said microscopic pits are spaced at variable intervals causing each of said optoelectrical elements to generate an output signal having a first component of higher amplitude and lower frequency and a second component of lower amplitude and higher frequency, further comprising first and second low-pass filters coupled to said first and second optoelectrical elements respectively for passing said first components of the output signals therefrom to said first and second peak detectors respectively.

* * * * *